June 28, 1960   C. F. LEATHERS   2,943,133
WELDING CABLE

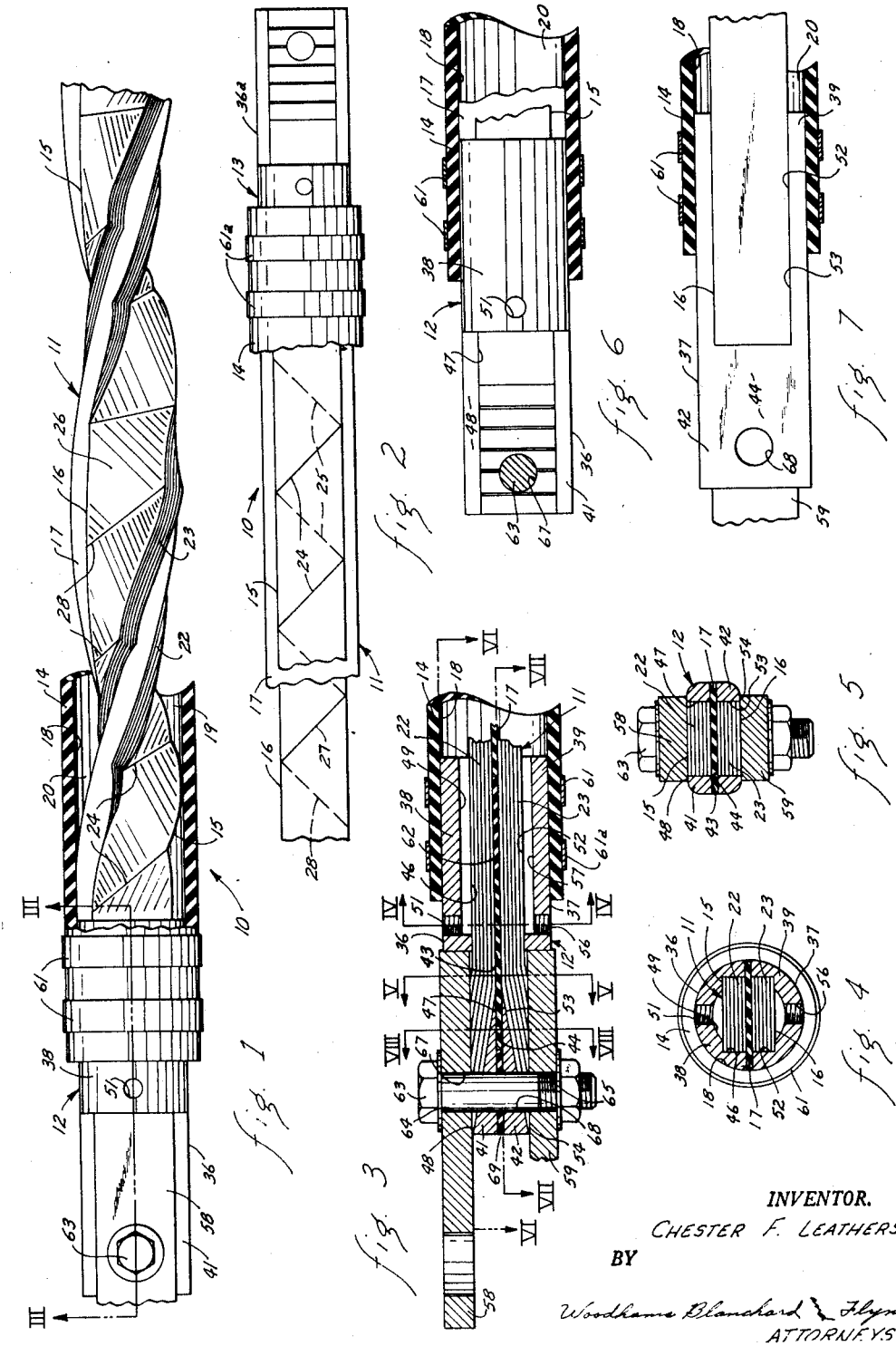

Filed July 5, 1957   2 Sheets-Sheet 2

INVENTOR.
CHESTER F. LEATHERS
BY
Woodhams Blanchard & Flynn
ATTORNEYS

2,943,133
United States Patent Office
Patented June 28, 1960

2,943,133

WELDING CABLE

Chester F. Leathers, 9326 E. Shore Drive, Portage Township, Kalamazoo County, Mich.

Filed July 5, 1957, Ser. No. 670,129

10 Claims. (Cl. 174—15)

This invention relates to an electrically conductive cable and particularly to a welding cable having a unitary construction eliminating the conventional joint between the terminal lug and the flexible conductor, and having a conductor constituting a plurality of twisted metallic strips.

A welding cable as conventionally known to the industry is a flexible conductor connecting a welding transformer to the welding electrodes and is particularly utilized in gun type welders where the electrodes, being portable, may be at a substantial distance from the transformer and are moved into many different positions and at many different distances from and with respect to the welding transformer. This requires that the cable connecting the secondary winding of the transformer to the electrodes be capable of a great amount of flexing without undergoing damage, have sufficient mechanical strength that the workman can drag the transformer element along with him if desired by pulling on the welding cable and yet have a minimum of connections, as soldered joints, between different parts of the completed assembly.

A large number of welding cables have been developed prior hereto and are in common use in the metalworking industry. However, the majority of these cables, insofar as I am aware, utilize a large number of relatively small gauge wires which are twisted together to form a rope-like construction, which rope-like construction is then arranged within a flexible protective casing, as a piece of rubber or neoprene tubing, and the ends of such rope are then connected, as by soldering or crimping, to solid copper terminal members or lugs. Provision is made within the flexible casing for the passage of water along or around the conductive rope for cooling purposes.

In such constructions, the many small wires, each having a very small radius, contact each other in substantially line or point contacts. Thus, when the cable flexes and the wires are caused to move with respect to each other, very high unit pressures are exerted between said wires and the relative motion therebetween causes wearing at a relatively rapid rate. This, in combination with the fact that the wires on the convex side of a given bend are placed under a substantial tensile strain, causes progressive and very rapid breakage of said wires and consequent breakdown of the cable.

Further, as the cable wires heat in response to electric current flowing therethrough, they tend to deteriorate in mechanical structure and eventually certain of the wires, particularly those which are also subjected to mechanical strain, break into several pieces. As the wires break in this manner and others, the small pieces of broken wires accumulate within the flexible casing and in response to the flow of cooling liquid therethrough they tend, even where filters are used, to collect at the outflow end of the casing. Eventually such wire pieces accumulate in such quantity as to restrict the flow of cooling liquid through the casing with the result that the cable becomes progressively hotter and the deterioration and resulting breakage of the wires progresses even more rapidly. This is a cumulative action and once it has commenced the cable may disintegrate very rapidly and need replacing. Inasmuch as these cables are rather expensive, a large amount of money soon becomes involved in the replacement of these cables in a plant where they are used on a substantially continuous basis, such as in an automobile plant.

A still further source of difficulty lies in the problems attendant upon the connection of the wires of a wire rope, as aforesaid, with the end lugs of a conventional welding cable. This has been the subject of a great deal of investigation which investigation is represented in a considerable number of patents, such as U.S. Patents No. 2,504,777, No. 2,247,133 and No. 2,691,691. The connection of the many small wires of a wire rope, as presently used within the welding cable, to an end lug has not only produced the problems incident to the mechanical connection as such, namely, fabrication and assembly problems, but it has also provided a further point at which deterioration and break-down will often occur. Even assuming that the solder which is normally used to secure these connections will fully and completely penetrate to the interior of the wire rope and affix each and every one therein to the end terminal, there will still be an area of localized heating in the region of, and due to, the soldered joint. In conventional practice, the coolant within the welding cable is intended also to overcome this area of localized heating, but it still remains a zone of potential breakdown. Thus, as the flow of water is obstructed in the manner indicated above, the deterioration at connection also proceeds with progressively increasing rapidity and thereby accelerates the break-down of the welding cable.

In seeking to overcome these various difficulties, and particularly to provide a welding cable which will be capable of longer and more reliable use, and one which has a greater mechanical strength than is available with present types of cables, I have devised a totally new construction which utilizes an organization of parts materially different from that utilized by presently conventional constructions and which effectively meets and minimizes the difficulties above outlined. More specifically, I have provided a plurality of copper strips, each strip being sufficiently heavy to avoid the progressive breakdown of individual wires as above outlined but being bent at intervals in a manner which permits the cable to twist and thereby become adequately flexible. Such strips of metal extend beyond the ends of an insulative, flexible casing and cooperate with a terminal member, which, in at least some embodiments of the invention, functions more as a supporting device than as a conducting element, to provide the end lugs of the cable. This construction is utilized to provide conductors as needed, and for arrangement in many possible ways to provide the desired cable.

Accordingly, the objects of the invention are the following:

(1) To provide a flexible welding cable having a high degree of mechanical strength and capable of long and rigorous use without appreciable deterioration.

(2) To provide a welding cable, as aforesaid, which will be free from the plurality of small parts, such as small wires, which in present practice are subject to progressive deterioration, resultant breakage and which then progressively clog the passage of cooling liquid past and through the welding cable.

(3) To provide a welding cable, as aforesaid, in which the conductors may continue past the end of an insulative, flexible casing and themselves may constitute much or all of the electrically contacting portion of the end lug of the welding cable.

(4) To provide a welding cable, as aforesaid, in which each of the conductors extends beyond the end of said flexible casing and then bend in a common direction to terminate in a common plan and thereby define a contact surface by which the welding cable can contact other conductors from which it is to receive electrical current or to which it is to deliver said current.

(5) To provide a welding cable, as aforesaid, in which there is provided a rigid portion comprising a part of the end lug but wherein said portion may be primarily a supporting element for the above-mentioned extended conductive elements and is not itself necessarily relied upon to carry any material portion of the welding current. Thus, if desired, the end lug may be made of non-conductive material so that it does not carry any part of the welding current, or, alternatively, it may be made of conducting material and thereby cooperate with the conductive elements in carrying such portion of the current as is determined by the specific design thereof.

(6) To provide a welding cable, as aforesaid, which can be constructed at a cost not materially, if any, exceeding the cost of presently conventional welding cables.

(7) To provide a welding cable, as aforesaid, wherein the voltage drop between the ends of the cable due to the reactance of the cable is maintained at a minimum.

(8) To provide a welding cable, as aforesaid, which will be capable of use on, and with, present welding machines without modification in any way of such machines.

(9) To provide conductor structure adaptable for use with a welding cable and which structure may be used in any desired number within an insulated cable casing.

(10) To provide a lug for a welding cable which is readily adaptable for use with any type of conductive element, specifically either a plurality of flat flexible strips or a rope-type conductor which permits the conductive element to extend therethrough into direct contact with the structure to which the lug itself is connected.

(11) To provide a lug structure of use with the end of an electrical conductor in which at least a substantial portion, and possibly all, of the electrical current passes through a continuous copper path from the conductor to the article with which connection is made.

Other objects and purposes of this invention will become apparent to persons familiar with this type of equipment upon reading the following specification and examining the accompanying drawings in which:

Figure 1 is a broken and fragmentary elevational view of one end of a welding cable embodying the invention.

Figure 2 is a broken and fragmentary elevational view of the other end of said welding cable and showing the bend lines in the conductors before such bends are made.

Figure 3 is a sectional view taken along the line III—III of Figure 1.

Figure 4 is a sectional view taken along the line IV—IV of Figure 3.

Figure 5 is a sectional view taken along the line V—V of Figure 3.

Figure 6 is a sectional view taken along the line VI—VI of Figure 3.

Figure 7 is a sectional view taken along the line VII—VII of Figure 3.

General description

Figure 8:
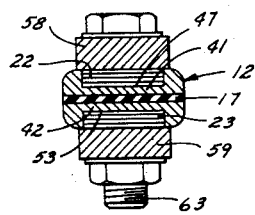
Figure 8 is a sectional view taken along the line VIII—VIII of Figure 3.

The structure of the present invention is adaptable for many types of electrically conductive uses, and even with welding cable use it is adaptable for use in conductors and cables of many different types and having varying numbers of conductive elements therein. However, for the purpose of conveniently illustrating the invention, the following description will be directed primarily toward the application of the conductive element of the present invention to use in a welding cable and it will be further assumed that the welding cable is provided with two conductive elements separated from each other by suitable insulation.

Turning now to the general type of structure here chosen to illustrate the invention, I have provided an elongated cable comprised of a pair of laminated, electrical conductors which are insulated from each other so that they may conduct current of different polarity and which are throughout the major part of their length housed within an electrically nonconductive casing. The opposite ends of the conductors and housing are engaged by a pair of cable heads or lugs whereby a coolant is circulated through the casing, around said conductors and between the laminations thereof, and whereby said conductors may be attached to, and between, means such as a transformer and welding electrodes. The conductors, which are each comprised of a plurality of flat electrically conductive strips arranged substantially parallel with each other, are bent at preselected angles and intervals transversely of their lengthwise extent in order to produce a spiral twist in the entire cable throughout the length thereof, such twist providing the cable with the necessary flexibility required by a welding cable.

For the purposes of convenience in description, the terms "leftwardly," and "rightwardly," as applied herein, will have reference to the cable structure, and parts thereof, as appearing in Figures 1 and 2. The terms "inner," "outer" and derivatives thereof will have reference to the geometric center of said cable and parts associated therewith.

Detailed construction

As shown in Figures 1 and 2, the welding cable 10 characterizing the invention is comprised of a conductive core 11 which is engaged at its opposite ends by a pair of substantially identical cable heads or lugs 12 and 13. A tubular cable casing 14 is mounted at its opposite ends upon said cable heads 12 and 13, and completely surrounds said conductive core between the cable heads. In this particular embodiment, said cable casing 14 is fabricated from resiliently flexible, electrically nonconductive material, such as a rubber impregnated fabric.

The conductive core 11, Figures 1, 2 and 3, is comprised in this embodiment of a pair of electrically conductive, laminated conductors 15 and 16 which are separated by a relatively flat, elongated central insulator 17, as shown particularly in Figures 1, 3 and 5. The central insulator is also preferably fabricated from a resiliently flexible and electrically nonconductive material. The lateral edges of the central insulator 17 snugly and continuously engage substantially diametrically opposed portions of the inner wall 18 of said casing 14, thereby effectively dividing the interior of the cable casing 14 into two passageways 19 and 20. The conductors 15 and 16, both of which are narrower than the central insulator 17, are located respectively in the passageways 19 and 20, and are spaced from the inner wall 18 of said casing 14.

As shown in Figures 3 and 4, the conductors 15 and 16 may be substantially identical in that they are comprised of a plurality of elongated flat and electrically conductive strips 22 and 23, respectively, which are arranged so that a cross-section of each conductor is substantially rectangular. The conductors 15 and 16, and the central insulator 17 between said conductors, which combine to form the conductive core 11, are twisted into a spiral, lengthwise of said core.

In this particular embodiment, the twisting of the conductors 15 and 16 is facilitated by imposing permanent distortions or bends in said conductors at uniform intervals therealong. For example, the conductor 15 is provided with uniformly spaced, relatively sharp bends along the lines 24 (Figures 1 and 2) which are at approximately 45 degrees to the lengthwise extent of said conductor 15 and on the outer surface thereof. The successive bends 24 are spaced from each other so that similar sharp bends, indicated by broken lines 25 in Figure 2, can be provided in the inner side of the conductor 15, adjacent to the central insulator 17, at approximately 45 degrees to the lengthwise extent of said conductor in the opposite direction of slope from the bend lines 24 on the outer side. Thus, because of the relative thickness of each conductor and its laminated structure, the sharp bends 25 on the inside of the conductor 15 will produce relatively gentle bends 26 on the outside of the conductor, as indicated in Figure 1, which extend between opposite ends of the sharp bend lines 24. These bends have the effect of producing a gentle spiral in conductor 15 lengthwise thereof while also providing hinge lines around which the conductor can bend with relative ease. Furthermore, such bends permit the formation of a spiral having a minimum outside diameter for a given number of spirals per unit of length. The number of such spirals per unit of length can be varied by varying the angle and extent of said bends, within the mechanical limitations imposed by the structure of the conductor and the individual strips.

Figure 9:
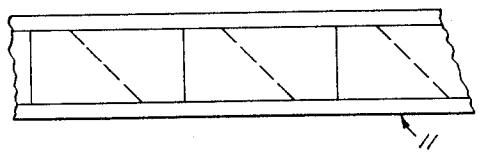
Figure 9 is a fragment of Figure 2, showing a variation in the arrangement of the bend lines along the conductive core.
Figure 10:
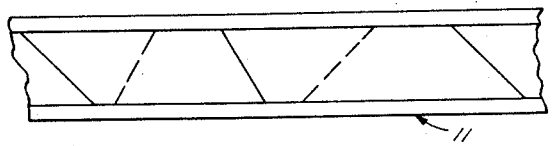
Figure 10 is a fragment of Figure 2, showing a further variation in the arrangement of the bend lines along the conductive core.
Figure 11:
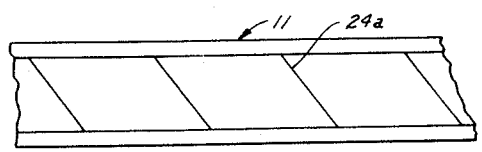
Figure 11 is a fragment of Figure 2, wherein the bend lines are located all on one side of the conductive core.

The conductor 16 (Figures 1 and 2) is also provided with sharp bend lines 27 and 28 on opposite sides thereof in a manner substantially identical to those discussed hereinabove with respect to the conductor 15. The relative spacing, as well as the angular positions of the bend lines 27 and 28 with respect to the conductor 16 will be the same as the corresponding bend lines on the conductor 15. However, when nesting the conductor 15 with the conductor 16 (Figure 2), the external sharp bend 24 on the outside of the conductor 15 will be aligned transversely of the conductive core 11 with a sharp bend 27 on the inside of the conductor 16 and, accordingly, a sharp bend 28 on the outside of the conductor 16 will be aligned with the sharp bend 25 on the inside of the conductor 15. Thus, the two conductors 15 and 16 will have cooperating bends whereby they will flex in corresponding, lateral positions. Figure 2 illustrates, in the flat, the relative relationship between a series of uniformly spaced equal angled bend lines prior to the actual effecting of a bend in such strip. Figures 9, 10 and 11 illustrate, in the flat, variations in arrangements of said bend lines.

Due to the twist in the conductive core 11, the individual strips 22 and 23 will tend to remain snugly against each other, whereby the conductors 15 and 16 are held snugly against the central insulator 17. The above description has assumed that the bends are applied to the conductive strips after they are assembled together to form a conductor 15 or 16. However, it will be recognized that said strips may also be bent independently and similarly and then nested together to form the conductor.

The cable head 12 may be, and preferably is, substantially identical to the cable head 13. Thus, the cable head 12 will be described in detail and such description will apply to cable head 13 unless otherwise stated. Parts of the cable head 13 will have the same numerical designations as corresponding parts of the cable head 12 with the suffix "a" added.

Figure 12:
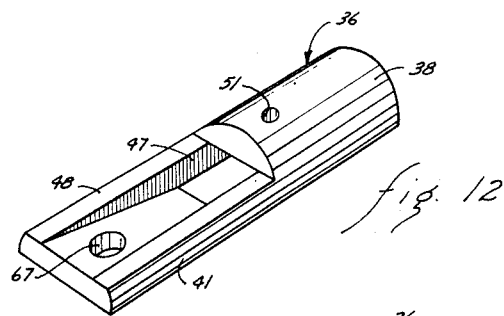
Figure 12 is an oblique view of one of the terminal members in the cable head or lug.
Figure 13:
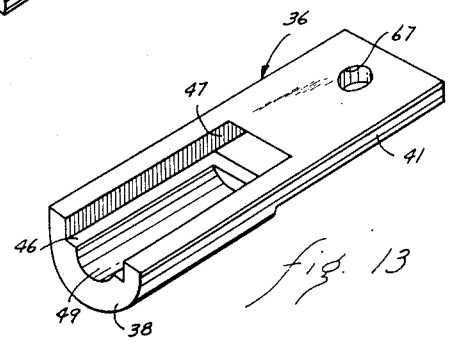
Figure 13 is an oblique view showing the reverse side of said terminal member appearing in Figure 12.

Said cable head 12 (Figures 3 and 4) is comprised of a pair of substantially identical terminal members 36 and 37, one of which is shown in Figures 12 and 13. Said terminal members have coolant-carrying ends 38 and 39, which have semi-cylindrical contours, and junction ends 41 and 42, respectively, which have substantially rectangular contours. The central insulator 17 extends between the opposed, inner surfaces 43 and 44 of the members 36 and 37 respectively. A more detailed description will now be given of the terminal member 36 and such will be understood to apply in substance to the terminal member 37.

The terminal member 36 (Figures 12 and 13) has a lengthwise recess 46 (Figures 3 and 4), in its inner surface 43 which extends the full length of the coolant-carrying end 38. Said recess 46 communicates with the inner end of a sloping passageway 47 which extends through the outer surface 48 of the junction end 41. The recess 46 has a rectangular cross-section (Figure 4) for snugly embracing the conductor 15 and holding it firmly against the central insulator 17. The conductor 15 also extends snugly through the passageway 47 and its free end is beveled (Figure 3) so that it lies in the plane defined by said outer surface 48 of the junction end 41.

The inner sidewall of the recess 46 has a lengthwise coolant groove 49 (Figures 3 and 4), which extends from the free end of the coolant end 38 to a point near the adjacent end of the passageway 47. A tapped opening 51 in the terminal member 36 communicates with the groove 49 near said point.

In a similar manner, the terminal member 37 (Figures 3 and 4) has a recess 52 connected to a passageway 53 for engaging the conductor 16, which extends through the outer surface 54. A tapped opening 56 in said member 37 communicates with a coolant groove 57 in the wall of the recess 52.

The terminal members 36 and 37 are constructed so that the cable casing 14 slides snugly over the outer surfaces of the coolant ends 38 and 39 up to the tapped openings 51 and 56, when said members are arranged with their inner surfaces 43 and 44 snugly against opposite sides of the central insulator 17. Hose clamp bands 61 (Figure 3), encircle the cable casing 14 where it extends over the terminal members 36 and 37 for effecting a leak-proof engagement therebetween, thereby compressing the terminal members 36 and 37, hence the conductors 15 and 16, against the central insulator 17. Accordingly, where an otherwise resilient central insulator 17 is satisfactory throughout the length of the conductive core 11 a relatively rigid insulative insert 62 is provided, as shown in Figure 3, between the conductors 15 and 16 at the point where the hose clamps 61 encircle the coolant ends 38 and 39.

Alternatively, the central insulator 17 and the insulative insert 62 may in many instances constitute a single strip of material extending the full length of the cable and the lugs associated therewith, which strip is sufficiently resilient to form the seal required of the portion 17 thereof and yet sufficiently rigid to be satisfactory for the portion 62 thereof. It has been found satisfactory for this purpose to use an elastomeric impregnated cloth, the elastomer being chosen to permit the necessary flexibility and yet permit the cloth to provide the necessary body against which the hose clamp band 61 and the bolt 63 can operate.

As stated above, the ends of the conductors 15 and 16 are beveled, thereby beveling the ends of the individual strips 22 and 23 within each conductor. Thus, each individual strip can be physically engaged by, and electrically connected to, one of the bars 58 and 59 which are disposed upon the opposite outer surfaces 48 and 54 of the junction ends 41 and 42 of the terminal members 36 and 37, respectively. A nonconductive bolt 63 extends through the openings 64 and 65 in the bars 58 and 59 and through corresponding openings 67 and 68 in the junction ends 41 and 42, respectively. A relatively rigid insulator 69 is disposed between the junction ends 41 and 42 in the vicinity of the bolt 63 to prevent conductive engagement between the terminal members. The bars 58 and 59 are connected in a substantially conventional manner to means such as welding electrodes or a transformer as desired.

The free ends of the individual strips 22 and 23 of the conductors 15 and 16, respectively, will normally be flush with the surface 48 of the lugs, but in some instances they may, if desired, extend slightly beyond the outer surfaces 48 and 54 of the junction ends 41 and 42, respectively, so that when the bars 58 and 59 are clamped into position the surfaces 48 and 54, a positive connection between said lugs and said conductors will be assured without the use of solder or other connective means.

While the foregoing description has thus far suggested that the structure might be, or at least could be, assembled without the use of solder, or similar material, for fastening the strips comprising each conductor and for fastening the respective conductors to the lugs, it will be recognized that, as well known in conventional practice, the employment of a suitable fastening material, such as solder, will provide a product which is greatly superior to the product obtained without the use of such connective material. Where solder is used, and this will be the normal situation for well understood reasons, one assembled conductor and lug will be dipped in a known manner into a container of molten solder and the solder portion permitted to extend from the leftward end of the lug as appearing in Figure 3 rightwardly to a point at least rightwardly of the hose clamp 61a and preferably slightly rightwardly of the hose clamp 61. However, in order to obtain the full advantages of the invention, the solder should not be permitted to extend to the extreme rightward end of the lug structure, for the reason that if the solder were permitted to extend to the extreme rightward end of the lug structure, there would then be, as there now is in conventional practice, a zone where the solder terminates in which a great deal of the bending of the cable is concentrated with consequent rapid weakening and failure of the elements comprising the conductor. By terminating the solder slightly leftwardly of the extreme rightward end of the lug, the bending at the point where the solder terminates is rather materially restricted and hence there is no concentration of such bending at any given location. This adds materially to the life of the resulting welding cable. Further, particularly where silver solder techniques are used, preventing the solder from reaching the extreme rightward end of the lug prevents excessive heating of the copper and consequent weakening of the copper at the same point where maximum bending will occur. Thus, this feature still further contributes to long cable life.

The cable head 13 (Figure 2), which is preferably substantially identical to the cable head 12, is comprised of a pair of terminal members, one of which is shown at 36a. The other end of the casing 14 is secured upon the cable head 13 by means of the hose clamp bands 61a.

*Operation*

Prior to use of the welding cable 10, the cable heads 12 and 13 at the opposite ends thereof will be connected by suitable means, including the bars 58 and 59 if needed, to the members which it is desired to have the welding cable 10 electrically connect. For example, said cable head 12 may be connected to welding electrodes, whereas the cable head 13 is connected to a welding transformer, in an otherwise substantially conventional manner. The tapped openings 51 and 56 are then connected as desired to sources of coolant, such as water. In one typical connection, the coolant passes through the recesses 46 and 52 and thence into the passageways 19 and 20 within the cable casing 14 and it then escapes through corresponding recesses and tapped openings in the cable head 13. Other connections are possible and well known to the industry and hence need no elaboration. The central insulator 17 prevents the coolant in one of the passageways 19 and 20 from moving into the other of said passageways, at least in any appreciable quantity.

The various bends in the conductors 15 and 16, represented by the sharp bend lines 24, 25, 27 and 28, for example, permit lateral flexing of the conductive core 11 in substantially any direction and to an adequate extent. Normally, the flexion will tend to occur around the natural hinge axes provided by the bend lines shown in Figures 1 and 2. Since the central insulator 17 and the cable casing 14 are fabricated from flexible insulating materials, they will bend readily with the conductors 15 and 16. The strips 22 and 23, from which the conductors 15 and 16, respectively, are constructed, are relatively wide by comparison to an individual strand of wire normally used in this type of a conductor. Thus, the relative movement between such strips is between wide flat surfaces, as distinguished from the very small contacting surfaces involved where a multitude of small wires are used, and hence the wear between such surfaces is of relatively minor nature. Flexing of the welding cable 10 about its hinge lines, even to very considerable extents, will not produce a fatigue in the metal strips like the fatigue encountered by the wire type conductors. Still further, there is very little or no chance that even violent flexing of said strips will fracture them or cause pieces of said strips to break away. Due to the gentle twist provided in the conductive core 11 there will be no opportunity for the outer strips in each conductor to separate from the other conductive strips and the strips will tend to remain closely adjacent to each other either with or without a flexion being imposed upon the conductive core 11.

*Modifications*

In the foregoing discussed embodiments, mechanical bending of the conductive strips was relied upon to control the twisting of said strips. However, it will be seen that twisting and flexibility in the core 11 can be produced by distortions in the conductive strips which, at least in appearance, do not suggest a particular twist pattern. Also the rate of twist and character of flexibility in the conductive core 11 can be varied substantially by varying the angle and location of the bends or distortions in the individual conductors. However, it is essential to this particular invention that the bends in one conductor be substantially aligned and compatible with the bends in the other conductor at any given point transversely of the conductive core. However, this does not necessitate that the bends be uniform either in angular relationship or spacing relationship lengthwise of the conductive core.

Particularly, the 45-degree bend angles of Figure 2 have been selected for illustrative purposes, only. As shown in Figures 9 and 10, such bend angles may be varied both with respect to each other, as well as to the lengthwise axis of the core 11. However, it will be recognized that bend angles on one of said conductors must correspond substantially to the bend angles on the other conductor at any given point along the lengthwise extent of the conductive core. It will also be recognized that the spacing of such bend angles can be varied lengthwise of the conductive core, as shown in Figure 10, to increase or decrease the rate of twist which is largely controlled by such bend angles. Under some circumstances, where less than the optimum advantages of the preferred structure will be acceptable, the sharp bend lines 24a (Figure 11) may be all in the same direction, the conductors being nested together at such bend lines, as stated above.

Figure 14:
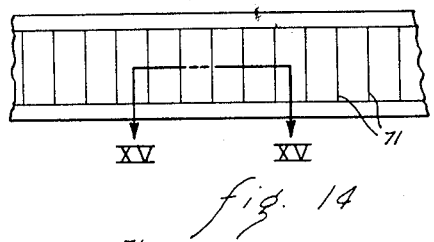
Figure 14 shows a further modification of the structure shown in Figure 2 wherein the bend lines are located parallel with each other, perpendicular to the longitudinal axis of the several strips and wherein such bends are alternatively and relatively sharp and gentle.
Figure 16:
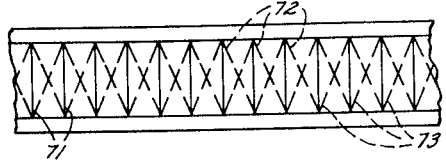
Figure 16 is a view similar to that of Figure 14 with additional lines showing the further bending which can occur when the strips are twisted.
Figure 15:
Figure 15 is a section taken on the line XV—XV of Figure 14.

Figures 14, 15 and 16 illustrate a still further method by which the individual conductor strips may be bent, which method will have the advantage of being capable of rapid and economical fabrication by merely running the strips, or groups of the strips, between suitable bending devices, such as a pair of gears (not shown).

Here, all of the sharp bends 71 (Figure 15) are in the same direction and are equally spaced and located transversely of the strip. In between the sharp bend, the strips curve in the opposite direction. Thus, the strips have bends 71 which are sharp and creased in one direction perpendicular to the lengthwise extent of the strips, and said strips have relatively gentle curves in the other direction.

In this embodiment, the bends will tend to pull out or be flattened somewhat along the edges of the strips, thereby producing a distortion which will cause said strips to twist about their lengthwise axes, in one direction or the other. Such flattening can be effected by pressure, by heat, or by twisting the strips until the edges thereof are stretched out. In any case, the resultant twist will produce slight curve lines which extend diagonally across the strips, as indicated by the broken lines 72 and 73 in Figure 16, between the opposite ends of successive sharp bend lines 71. For a twist in one direction, the curve lines 72 will be dominant, and for a twist in the opposite direction, the curve lines 73 will be dominant. These bend lines 72 or 73 will occur, as illustrated in Figure 16, even though they may be almost imperceptible to the naked eye in an actual embodiment of this form of the invention.

By way of specific example, the form of conductor shown in Figures 14, 15 and 16 has strips of copper which are ⅞ inch wide and 0.010 of an inch thick. These strips are bent by running groups of fifteen at a time through a pair of gears. The bending provided is such that there is a vertical distance between 0.010 and 0.015 inch distance between the peaks and valleys of the bent strips.

It will be observed in Figures 3 and 6 that the lug 12 is disposed completely within a cylinder substantially defined by the external surfaces of the coolant-carrying ends 38 and 39 of the terminal members 36 and 37. Thus, since the casing 14 has an internal diameter as large as the diameter of said cylinder, said casing 14 can be removed from the cable core 11 by sliding it over the lug 12, or the lug 13, and without disconnecting said lug from the conductors 15 and 16.

Thus, although a particular preferred embodiment of the invention has been disclosed herein for illustrative purposes, it will be understood that variations or modifications thereof which lie within the scope of the invention are fully contemplated unless specifically stated to the contrary in the appended claims.

I claim:

1. A flexible welding cable comprising in combination: first and second conductors each comprising a plurality of stacked, relatively wide and thin, flexible strips of electrically conductive material, each of said strips being twisted about a central longitudinal axis and all of said strips of each conductor being substantially nested with each other to form a laminated conductor of high current carrying capacity; a flexible strip of insulating material separating said first and second conductors; a flexible, electrically nonconductive casing closely surrounding said conductors and extending for at least a portion of the longitudinal length of said conductors, said casing having an electrically non-conductive inner surface; and terminal members connected to the ends of said first and second conductors.

2. The cable defined in claim 1 including means closing the ends of said casing and means providing connection for circulating a cooling fluid through the interior of said casing and in contact with the strips comprising both of said conductors.

3. The cable defined in claim 1 including closure means for closing the ends of said casing, said closure means each having an opening therethrough permitting extension of said conductors through said openings and beyond said closure means for electrical engagement, and said insulating means also extending through said openings and beyond said closure means.

4. A flexible cable for conveying electrical current including: a laminated conductor comprised of a plurality of nested, relatively thin and wide, flexible strips of electrically conductive material, said strips being relatively sharply bent at corresponding points therealong along a plurality of substantially uniformly spaced and parallel lines extending cross-wise to the lengthwise extent of said conductor, all said bends being in the same direction with respect to said strips and being separated by gentle curves in said strips curved in the opposite direction, said bends and curves being of shorter radii midway between the lengthwise edges of said conductor than adjacent to said edges, so that said conductor is twisted about the lengthwise axis thereof; and lug means arranged for holding and positioning one end of said conductor for electrical engagement.

5. A flexible welding cable comprising: a plurality of laminated conductors, each comprised of a plurality of relatively thin and wide, flexible, nested strips of electrically conductive material and each of said strips being bent at corresponding points thereon along a plurality of spaced, transverse lines at corresponding intervals lengthwise thereof, at least some of said lines being preformed and at least some of said lines being at angles other than perpendicular to the lengthwise extent of said strips to effect cooperating spirals in said strips in each conductor about a central longitudinal axis so that each of said conductors is twisted about said axis; at least one strip of electrically nonconductive material separating said conductors, a flexible, electrically nonconductive casing closely surrounding said conductors and said nonconductive strip between the ends thereof; and cable head members closing the opposite ends of said casing and positioning the adjacent ends of said conductors.

6. The structure of claim 5 wherein said bend lines in said conductors are disposed at substantially uniform angles to the lengthwise extent of said conductors and the direction of bend of said conductors about said lines alternates lengthwise of said conductors from one side thereof to the opposite side, the bends in one conductor corresponding transversely of the lengthwise extent of the cable with the bends in the other conductor.

7. The structure of claim 5 wherein the nonconductive strip extends laterally beyond both edges of said conductors for snugly engaging the inside wall of said casing and thereby forming with said casing a pair of independent passageways spiralling lengthwise through said casing.

8. The structure of claim 5 wherein said nonconductive strip between said conductors divides the interior of said casing into a pair of separate spiral passageways, and said cable head members each have a pair of openings communicating respectively, with the opposite ends of said passageways.

9. The structure of claim 5 wherein each said cable head member is comprised of a pair of semi-cylindrical terminal members which are arranged for snug reception into the adjacent ends of said casing, said nonconductive strip extending between said terminal members; and wherein each said terminal member has a passageway through which one of said conductors extends, the passageways in a said pair of terminal members having end portions which diverge with respect to each other.

10. The structure of claim 9 wherein said terminal members have substantially parallel remote surfaces near said end portions through which the diverging ends of said passageways open, and the ends of said conductors are beveled so that the ends of their individual strips lie substantially and respectively within the planes defined by said lateral surfaces, each such strip being thereby electrically engageable with means engaging said flat surfaces.

References Cited in the file of this patent

UNITED STATES PATENTS

| | | |
|---|---|---|
| 1,674,829 | La Bean | June 26, 1928 |
| 2,200,776 | Hoover | May 14, 1940 |
| 2,440,668 | Tarbox | Apr. 27, 1948 |
| 2,483,301 | Roberds | Sept. 27, 1949 |
| 2,691,691 | Wreford | Oct. 12, 1954 |
| 2,835,721 | Leathers | May 20, 1958 |
| 2,847,499 | Peterson | Aug. 12, 1958 |